US011907920B2

(12) United States Patent
Banerjee et al.

(10) Patent No.: US 11,907,920 B2
(45) Date of Patent: Feb. 20, 2024

(54) USER INTERACTION ARTIFICIAL INTELLIGENCE CHAT ENGINE FOR INTEGRATION OF AUTOMATED MACHINE GENERATED RESPONSES

(71) Applicant: Truist Bank, Charlotte, NC (US)

(72) Inventors: Sudeshna Banerjee, Waxhaw, NC (US); Paul Gerard Mistor, Winston-Salem, NC (US)

(73) Assignee: TRUIST BANK, Charlotte, NC (US)

( * ) Notice: Subject to any disclaimer, the term of this patent is extended or adjusted under 35 U.S.C. 154(b) by 0 days.

(21) Appl. No.: 17/661,388

(22) Filed: Apr. 29, 2022

(65) Prior Publication Data

US 2023/0353516 A1 Nov. 2, 2023

(51) Int. Cl.
| | | |
|---|---|---|
| G06Q 20/10 | (2012.01) | |
| G06F 16/35 | (2019.01) | |
| G06F 40/30 | (2020.01) | |
| G06F 40/20 | (2020.01) | |
| G10L 15/22 | (2006.01) | |
| H04L 51/02 | (2022.01) | |
| H04M 3/51 | (2006.01) | |
| G06N 3/04 | (2023.01) | |
| G06N 3/045 | (2023.01) | |
| H04L 51/046 | (2022.01) | |
| H04M 3/493 | (2006.01) | |
| H04M 3/22 | (2006.01) | |

(52) U.S. Cl.
CPC ........... *G06Q 20/108* (2013.01); *G06F 16/35* (2019.01); *G06F 40/20* (2020.01); *G06F 40/30* (2020.01); *G06N 3/04* (2013.01); *G06N 3/045* (2023.01); *G10L 15/22* (2013.01); *H04L 51/02* (2013.01); *H04L 51/046* (2013.01); *H04M 3/493* (2013.01); *H04M 3/5166* (2013.01); *G10L 2015/223* (2013.01); *H04M 3/2281* (2013.01)

(58) Field of Classification Search
CPC ....... H04L 51/046; H04L 51/02; G06F 40/30; G06N 3/045; H04M 3/493; G10L 15/22
See application file for complete search history.

(56) References Cited

U.S. PATENT DOCUMENTS 11,706,337 B1 * 7/2023 Mitchem ................. G06F 40/40
704/270.1
2023/0011434 A1 * 1/2023 Werdell ................. G06Q 10/10

\* cited by examiner

*Primary Examiner* — Suraj M Joshi
(74) *Attorney, Agent, or Firm* — Michael A. Springs, Esq.; Shumaker, Loop & Kendrick, LLP; Patrick B. Horne

(57) ABSTRACT

An artificial intelligence (AI) system for guiding a user interaction in a phone call or chat session. The system includes a computer running an AI algorithm, such as a machine learning algorithm, which is trained to recognize patterns in user interaction dialog which lead to satisfactory outcomes for the user. The system may operate in a completely autonomous mode, or the system connect a human agent in the loop. The algorithm adaptively guides the dialog to achieve a favorable outcome based on the current status of the dialog—including identifying a next question to ask, information to provide, or an action to take. The algorithm is trained via supervised learning using real dialog transcriptions from past user interactions which have been supplemented with decision points and outcomes. After deployment, update training may be performed on the algorithm using data captured by the system after the user interactions.

19 Claims, 8 Drawing Sheets

USER INTERACTION ARTIFICIAL INTELLIGENCE CHAT ENGINE FOR INTEGRATION OF AUTOMATED MACHINE GENERATED RESPONSES

FIELD

The present disclosure relates generally to the field of automated user interaction systems, and more particularly to an artificial intelligence (AI) system for guiding user interaction via a voice response unit or a chat engine, where the AI system is trained—using real dialog transcriptions from past user interactions which have been supplemented with decision points and outcomes—to learn what questions to ask and what actions to take based on user responses in order to achieve a most favorable outcome.

BACKGROUND

Automated phone systems (known as Voice Response Units, or VRUs, among other names) have been in use for many years. These systems use a computer to answer phone calls (such as from customers or clients) and have an algorithm which may ask the caller a series of questions and attempt to provide a satisfactory resolution to whatever question or problem the caller is calling about. Similar systems known as "chat engines" or "chat bots" exist and are used for textual interaction with a user, where the user interacts with the chat system via a computer window and keyboard or a mobile device screen.

Existing VRUs and chat engines use algorithms which are programmed based on a human-defined set of rules—such as what question to ask first, and what question to ask based on various responses to the first question, etc. These systems are, in some instances, able to provide a satisfactory answer to the caller, or direct the caller to additional resources which can provide the answer. However, these existing systems are programmed with static logic which can anticipate some question/answer scenarios, but cannot anticipate all of the requests that a caller may have, and cannot anticipate many of the answers that a caller may give when responding to a particular question. As a result, it is well known that many callers give up on the question and answer session, and simply say "representative" repeatedly until they finally get to talk to a live person.

In view of the circumstances described above, there is a need for an integrated voice response and chat system which uses the outcomes of past user dialogs to guide a current call or chat session to a satisfactory outcome.

BRIEF SUMMARY

The present disclosure describes an artificial intelligence (AI) system for guiding a user interaction in a phone call or chat session including dialog and actions. The system includes a computer running an AI algorithm, such as a machine learning algorithm, which is trained to recognize patterns in user interaction dialog which lead to satisfactory outcomes for the user. The user may be a person (such as a client) calling in to a business on a phone, or the user may be interacting with the business via a text-based chat session. The system may be operating in a completely autonomous mode (voice menu prompts on phone calls, or automated textual prompts on chat sessions), or the system may connect a human agent in the loop. In all of these scenarios, the AI algorithm adaptively guides the dialog to achieve the most favorable outcome based on the current status of the dialog—including identifying a next question to ask the user in certain situations, identifying an information item to provide the user in certain situations, and identifying an action to take in certain situations. The actions taken include transactions such as making a purchase or a money transfer, and also include invoking the assistance of a human agent when needed.

The AI algorithm is trained using real dialog transcriptions from past user interactions which have been supplemented with decision points and outcomes. For example, it is normal for the business to have a database of past user interactions (transcribed phone calls, and text-based chat dialogs). Each of these user interactions can be reviewed by a human analyst to identify decision points (e.g., determining what question, information or action to present to the user, or determining that a human agent is needed on the call or chat). Each of the user interactions is also analyzed to identify the resolution (the information or action that satisfied the user), along with a satisfaction level of the outcome. The database of past user interactions, supplemented with decision points and outcome data, is provided as a training database for the AI algorithm. Both satisfactory and unsatisfactory outcome examples are included in the training database, as the AI algorithm learns from both types of scenarios.

After initial training and deployment, ongoing training may be performed on the AI algorithm using recently-completed system-guided user interactions, where the dialog and decision points are captured from each user interaction, and the satisfaction level of the outcome is defined at the conclusion of the interaction either by the user or by a human agent.

The features, functions, and advantages that have been discussed may be achieved independently in various embodiments of the present disclosure or may be combined in yet other embodiments, further details of which can be seen with reference to the following description and drawings, along with the appended claims.

BRIEF DESCRIPTION OF THE SEVERAL VIEWS OF THE DRAWINGS

Figure 1:
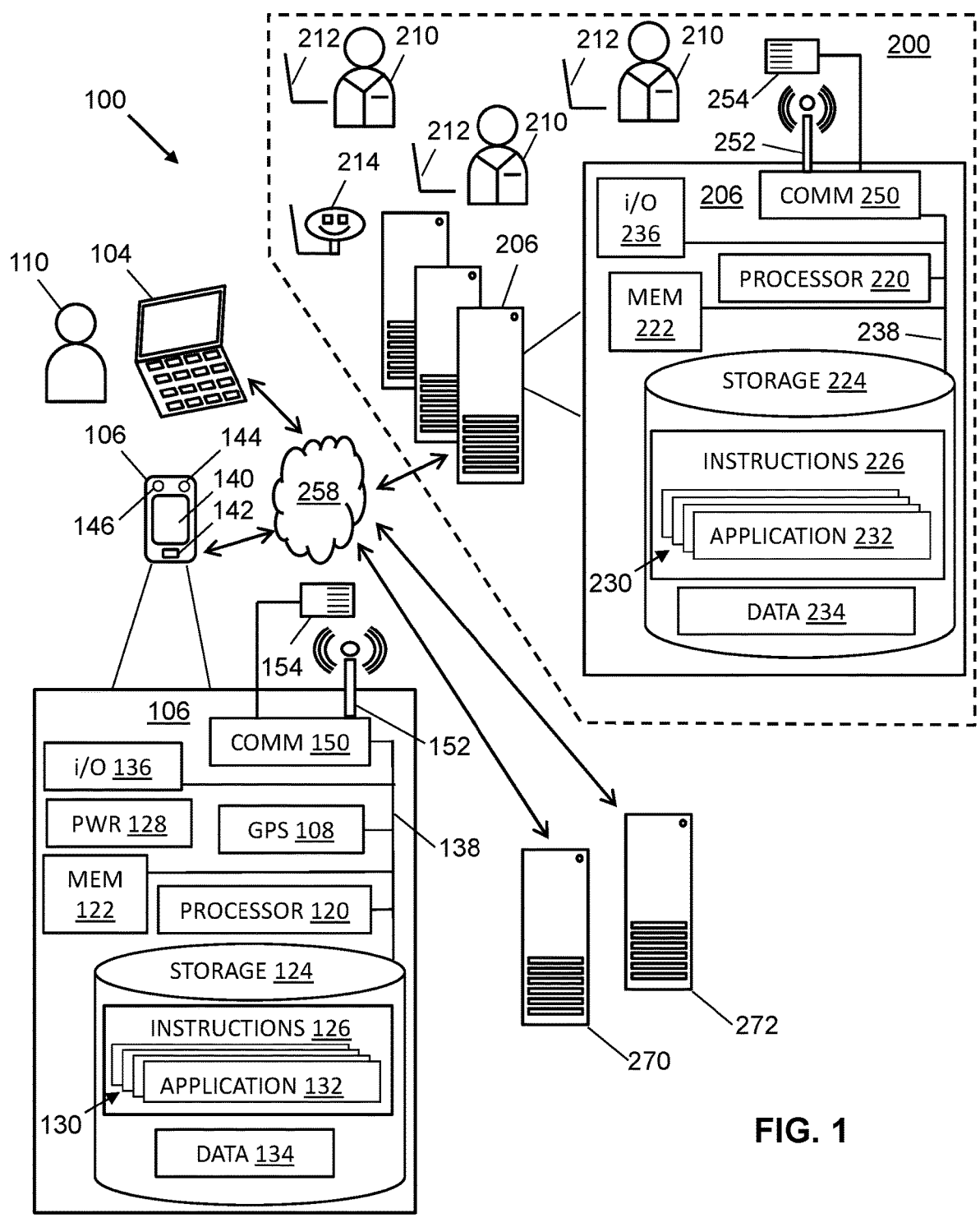

Having thus described embodiments of the invention in general terms, reference will now be made to the accompanying drawings, wherein:

FIG. 1 illustrates an enterprise system, and environment thereof, according to at least one embodiment.

Figure 2A:
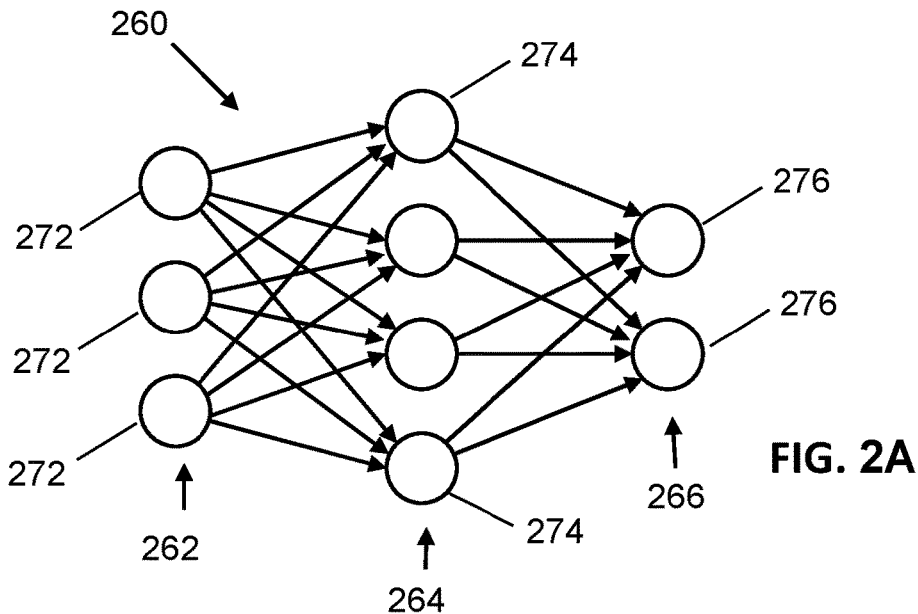

FIG. 2A is a diagram of a feedforward network, according to at least one embodiment, utilized in machine learning.

Figure 2B:
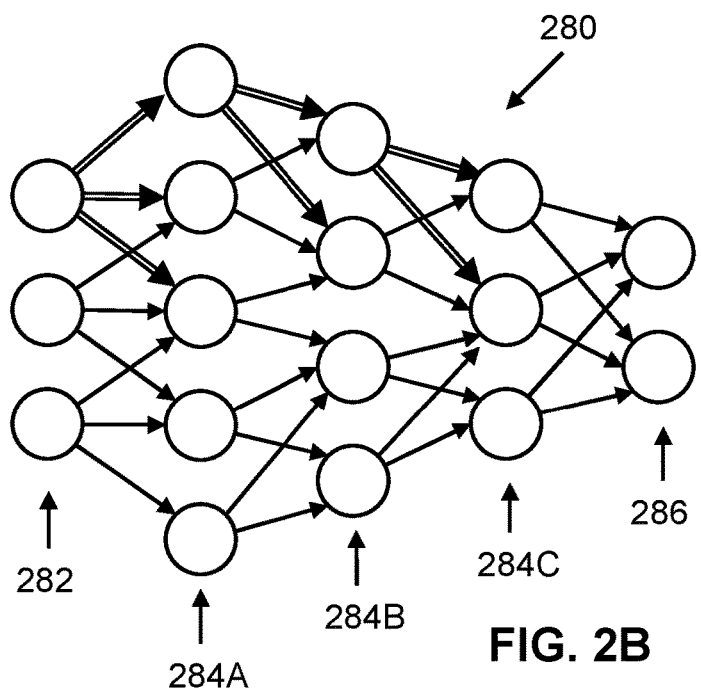

FIG. 2B is a diagram of a convolution neural network, according to at least one embodiment, utilized in machine learning.

Figure 2C:
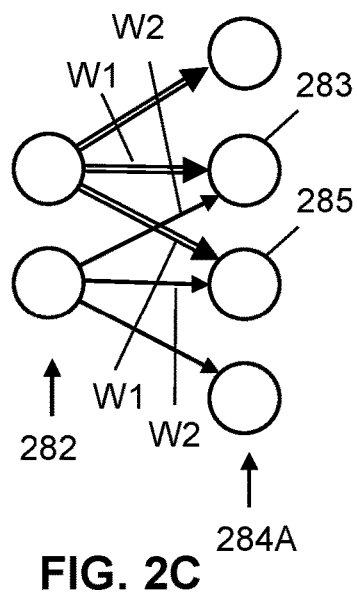

FIG. 2C is a diagram of a portion of the convolution neural network of FIG. 2B, according to at least one embodiment, illustrating assigned weights at connections or neurons.

Figure 3:
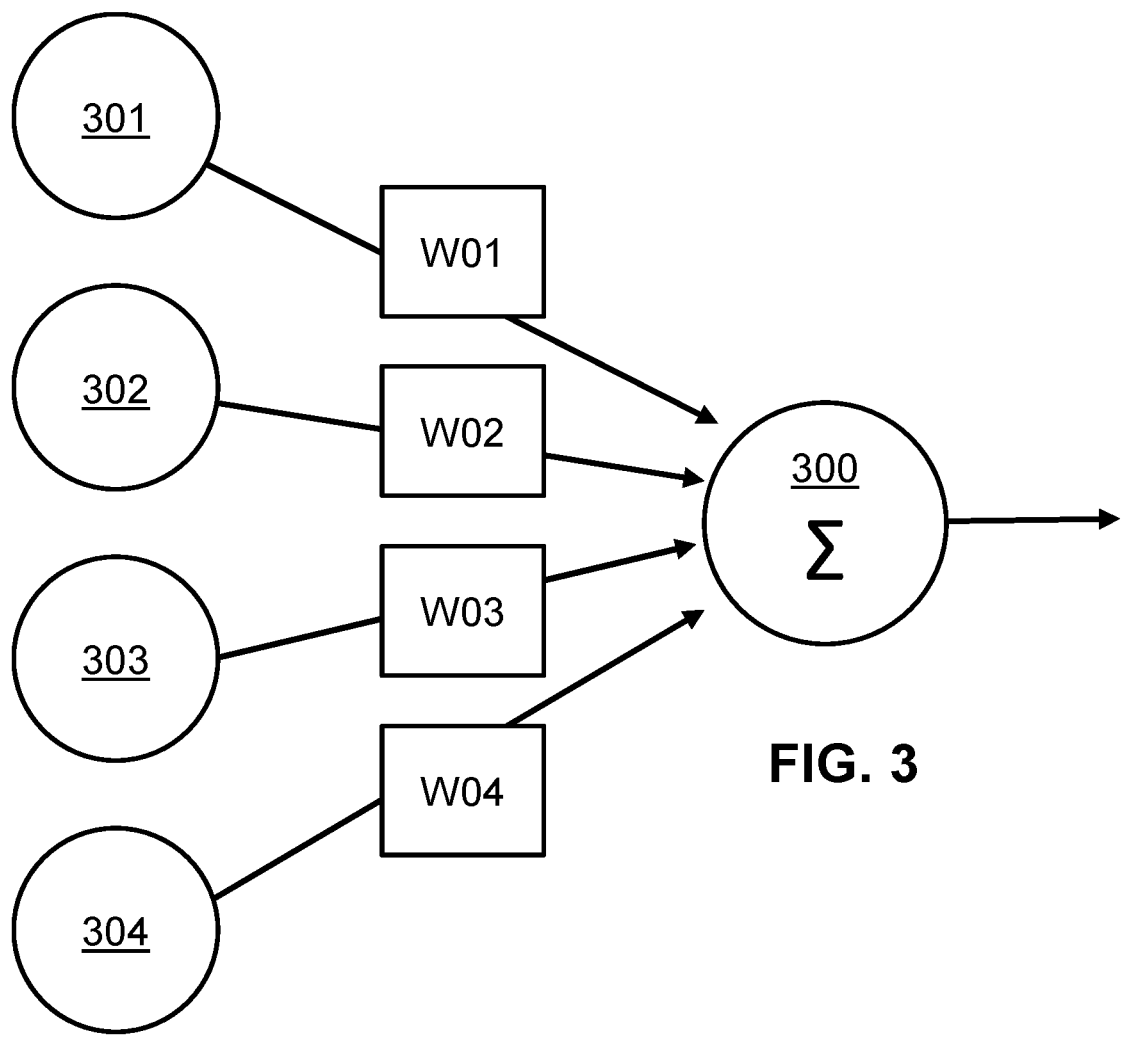

FIG. 3 is a diagram representing an exemplary weighted sum computation in a node in an artificial neural network.

Figure 4:
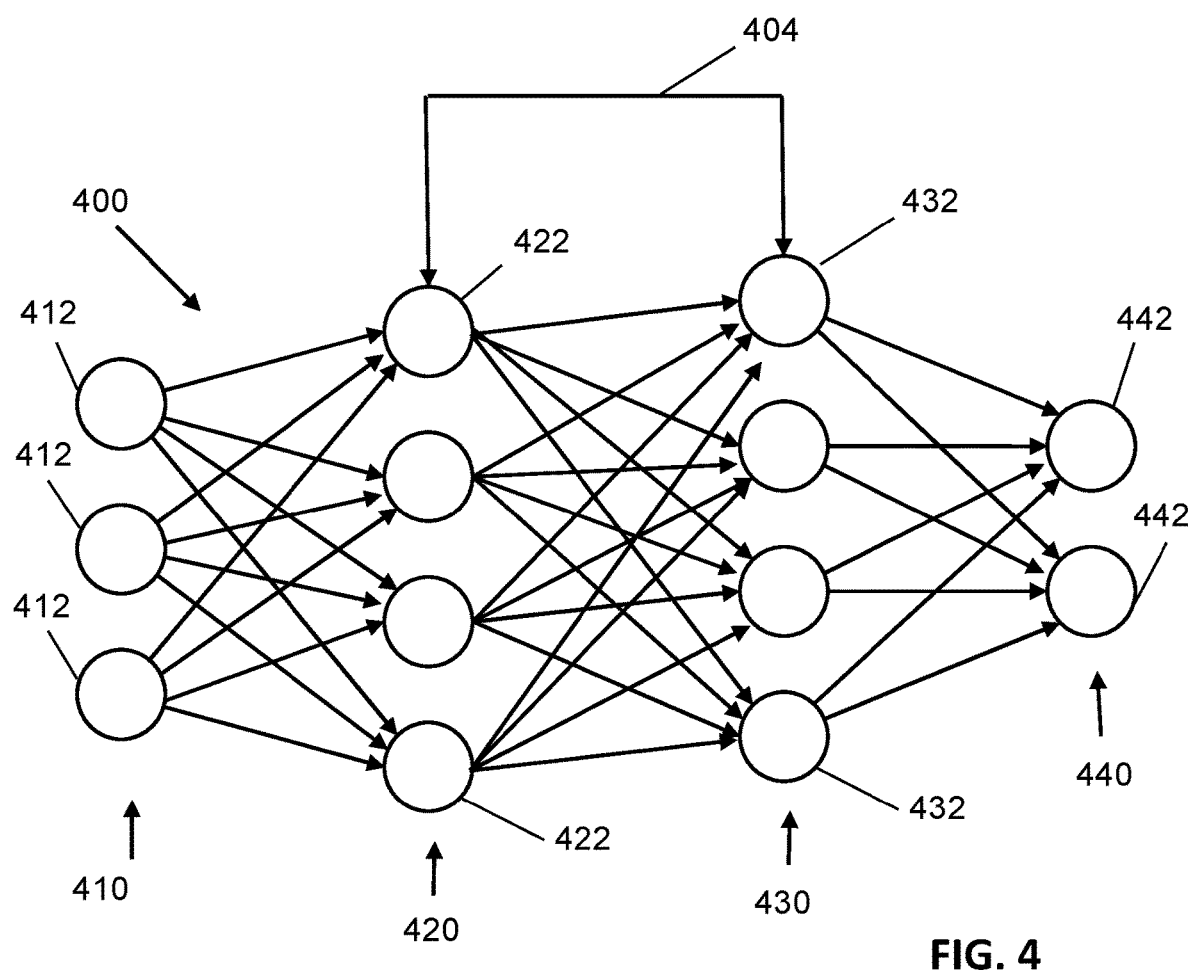

FIG. 4 is a diagram of a Recurrent Neural Network RNN, according to at least one embodiment, utilized in machine learning.

Figure 5:
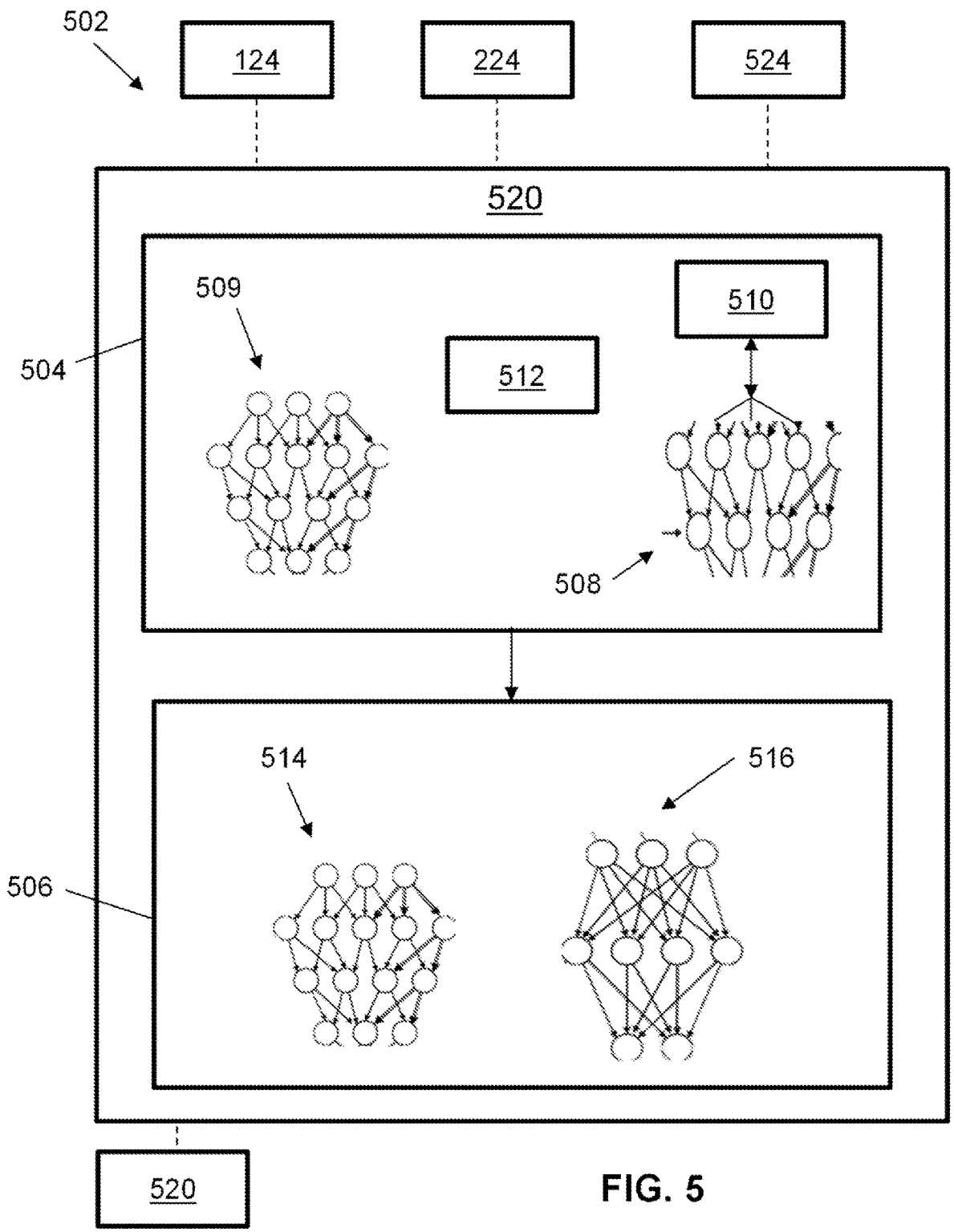

FIG. 5 is a schematic logic diagram of an artificial intelligence program including a front-end and a back-end algorithm.

Figure 6:
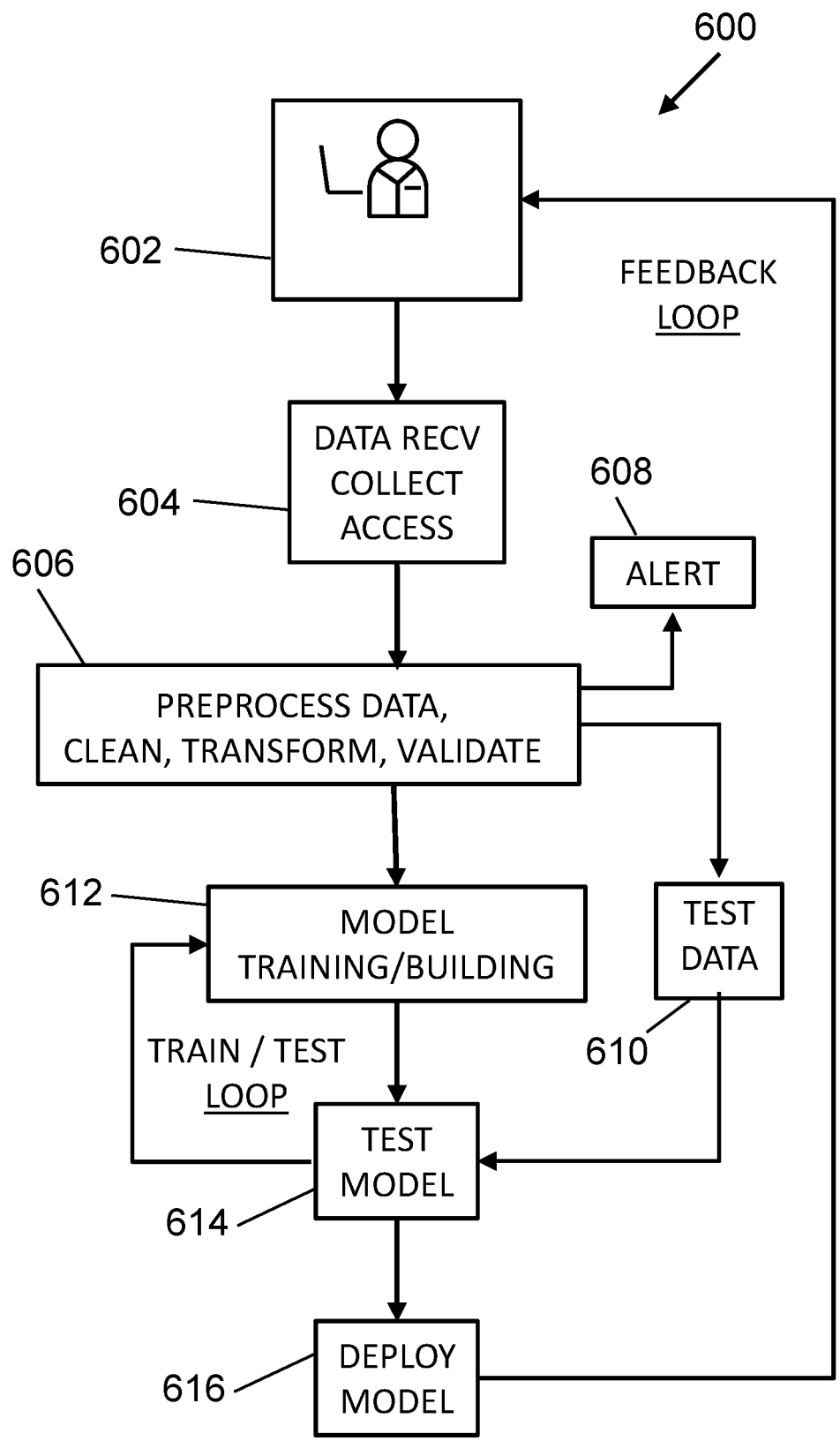

FIG. 6 is a flow chart representing a method, according to at least one embodiment, of model development and deployment by machine learning.

Figure 7:
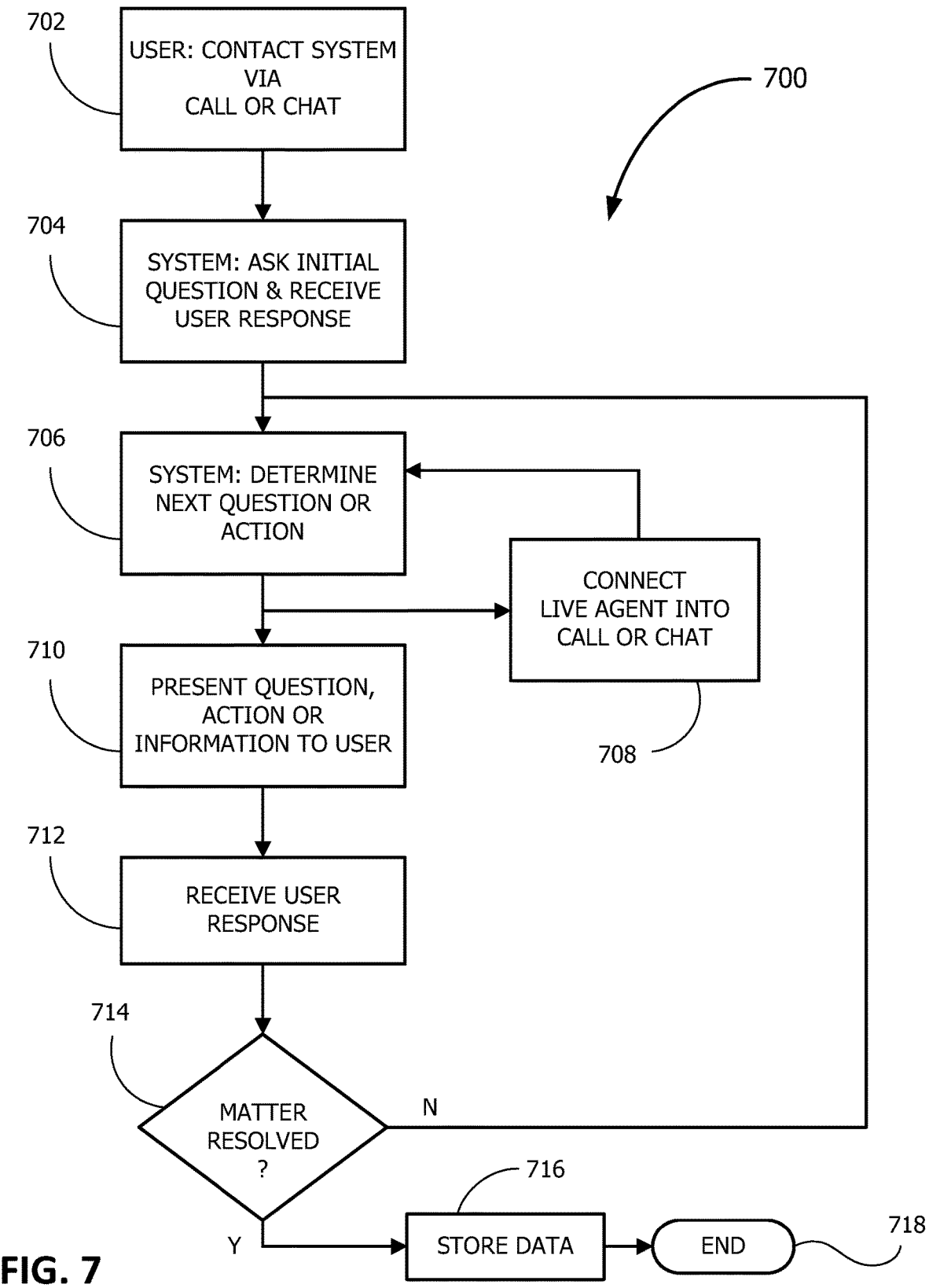

FIG. 7 is a flow chart diagram representing a method of guiding a user interaction including dialog and actions, using a machine learning algorithm of the type depicted in earlier figures, according to at least one embodiment of the present disclosure.

Figure 8:
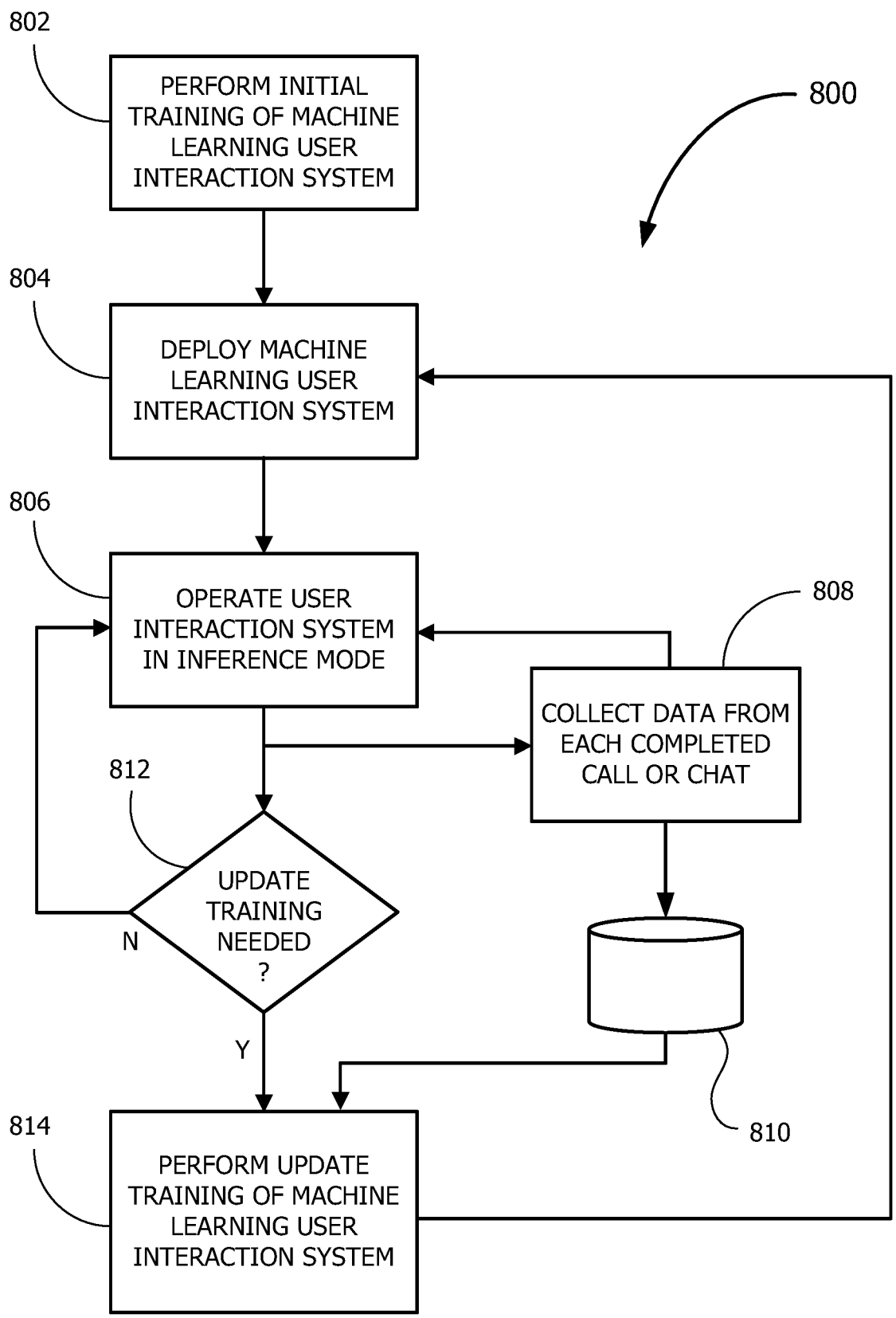

FIG. 8 is a flow chart diagram representing a method of training and deploying a machine learning algorithm for guiding a user interaction as described in FIG. 7, including performing ongoing update training of the machine learning algorithm based on actual outcomes of real user interactions handled by the algorithm, according to at least one embodiment of the present disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 270 and 272 are expressly illustrated in FIG. 1, representing any number and variety of data sources, users, consumers, customers, business entities, banking systems, government entities, clubs, and groups of any size are all within the scope of the descriptions. In at least one example, the external systems 270 and 272 represent automatic teller machines (ATMs) utilized by the enterprise system 200 in serving users 110. In another example, the external systems 270 and 272 represent payment clearinghouse or payment rail systems for processing payment transactions, and in another example, the external systems 270 and 272 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 270 and 272 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 272 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set or database) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled (thicker) arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g., CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data having the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Having described the general architecture, features and functions of AI systems, including various types of neural networks and other machine learning algorithms, attention will now be turned to specific applications addressed by the present disclosure. The following discussion relates to applications where a person (such as a client) places a phone call or initiates a chat session with a business, for the purpose of obtaining certain information, performing a certain action, or the like. Throughout the following discussion, the terms "client" and "business" are used to describe the two parties in the context of certain example dialogs, decisions and outcomes. However, it is to be understood that the example of a client and a business is merely illustrative, and that the techniques of the present disclosure are applicable to all manner of user interactions—including a citizen contacting a government office, a customer contacting a company about an order, a person (who is not a client) contacting a business in a "cold call", and so forth. In short, the disclosed techniques may be applicable to any sort of query or dialog between a person and an organization.

The basic scenario, addressed by the techniques of the present disclosure, is where a client contacts a business, which is a bank in the examples discussed here. The client may have a problem (e.g., can't log in to a mobile app), may have a request for information (e.g., what is the balance in my checking account?), or may want to perform a transaction (e.g., transfer funds from one account to another), among the many possible reasons for the client contact. The contact may be via a phone call (an audio call, where the automated system is known as a voice response unit or system, and where questions are answered by the client either verbally or by pressing the digits 0 through 9), or the contact may be via a text-based chat session (a "chat engine", where the client uses a computer or mobile device with a display and keypad, and all interaction between the client and the automated system is via text dialog).

Current voice response systems and automated chat systems suffer from several drawbacks. Most people have experienced the frustration of interacting with a voice-response system or a chat engine which asks a series of questions which are unnecessary or unrelated to the reason for the contact. In many such instances, a satisfactory resolution of the user's question or request is never reached, or is reached only after a lengthy dialog, and often only after a human agent is finally involved. These frustrating situations are due to the fact that existing voice-response systems and chat engines are programmed using static logic, and are unable to adapt to the situation about which the client is making the contact.

The present disclosure describes techniques for training and deploying an AI system, particularly a machine learning algorithm, for guiding the dialog during a client interaction with a business so that a satisfactory outcome is achieved as quickly and efficiently as possible. The algorithm receives inputs primarily from client responses in the form of menu selections, text inputs and/or spoken dialog. The algorithm considers not only a most recent client response, but also previous responses in the current dialog session. The algorithm provides outputs including deciding what question or questions to put forth next, what information to present to the client, and what actions should be performed. The actions may include transactions (such as a fund transfer) or presentation of information, and the actions may include the simple act of connecting a live agent with the client.

The system may be operating in a completely autonomous mode (voice prompts on phone calls, or automated textual prompts on chat sessions), or the system may be operating with a human agent in the loop. When the system is operating with a human agent in the loop, the machine learning algorithm suggests a next question or action and that question or action may be relayed to the client by the human agent. In all of these scenarios, the machine learning algorithm adaptively guides the dialog and actions to achieve the most favorable outcome based on the current status of the dialog. The advantage of using a machine learning algorithm to guide user interaction dialog is that the machine learning algorithm can be trained to recognize patterns in user interaction dialog which lead to satisfactory outcomes for the user.

In preferred embodiments, the machine learning algorithm is trained using real dialog transcriptions from past user interactions which have been supplemented with additional data needed to perform supervised learning. Supervised learning is a machine learning training approach that is defined by its use of labeled datasets. These datasets are designed to train or "supervise" algorithms into classifying data or predicting outcomes accurately. Using labeled inputs and outputs, the machine learning algorithm can measure its accuracy and learn over time.

For example, it is normal for the business to have a database of past user interactions (transcribed phone calls, and text-based chat dialogs). Each of these user interactions can be reviewed by a human analyst to identify decision points (e.g., deciding what question to ask next, determining what information or action will address the reason for the user's call or chat, or determining that a human agent is needed on the call or chat). Each of the user interactions is also analyzed to identify the resolution (the information or action that actually satisfied the user; that is, provided a resolution), along with a level of user satisfaction with the outcome. The database of past user interactions, supplemented with decision points, resolutions and outcome data, is provided as a training database for the initial training of the machine learning algorithm using supervised learning. Both satisfactory and unsatisfactory outcome examples may be included in the training database, as the machine learning algorithm learns from both types of scenarios.

After initial training, the machine learning algorithm for user interaction guidance is deployed and used for handling real client calls and chats. The usage of the machine learning system for live operations is known as inference mode.

Ongoing training may periodically be performed on the machine learning algorithm using recently-completed system-guided user interactions, where the dialog, decision points and actions are captured during each user interaction, the resolution is also typically known following the user interaction, and the satisfaction level of the outcome is defined at the conclusion of the interaction either by the user or by a human agent. By using user interactions which were actually handled by the machine learning algorithm as examples, with the examples including both favorable and unfavorable outcomes, the periodic ongoing training can further improve the efficiency and effectiveness of the machine learning algorithm for user interaction.

The interaction between the system and the user (the business and the client) may begin with a list of menu options provided by the system (e.g., select one of the following options which best describes the reason for your call or chat), or the interaction may begin with the system asking the user for a brief description of the reason for the call or chat. In either case, the machine learning algorithm determines the next question or action based on the user response. In the case of a first question in the form of a menu selection, the next question or action from the system is likely predetermined based on the selection. In the case of a first question asking for a free-form spoken or text input by the user, the system may analyze the response for keywords or keyword patterns to determine the next question or action.

In many cases, a second question is asked of the user. After a second question is asked by the system and answered by the user, the machine learning algorithm has more information upon which to base its next decision. For example, if a client responds to a second question in a manner that is inconsistent or unexpected relative to the client's response to the first question, the machine learning algorithm may infer that it is best to bring a live agent onto the call or chat right away. Other circumstances may also result in bringing a live agent onto the call or chat—such as determining that the client's problem or question is complex and will require a person with a particular skill set to handle. On the other hand, the machine learning algorithm may determine after one or two questions and answers that the client's question or request can be handled with high confidence by performing a certain action (e.g., reciting certain account data over the phone, or displaying account data on a display screen).

The variety of types of questions, requests and problems that a banking client may have is nearly endless. Examples include questions about an account balance or a payment due date, a request to pay a bill or make a transfer from one account to another, a problem logging into a mobile app or a bank website, a report of an apparent fraudulent charge, and many others. Because of the large variety of reasons for the client's call or chat session, and the various ways that each reason may be described by a particular user, it is very difficult to anticipate a series of questions for a user interaction which will quickly lead to the matter being resolved. This is precisely the reason for embodying the user interaction system in a machine learning algorithm, which is able to learn effective strategies for guiding user interactions to a quick and successful resolution.

In calls or chat sessions without a live agent connected, the machine learning algorithm determines a next action or question, based on a most recent client response and previous client responses if available, and the system presents the action or question to the client. Examples include data (such as an account balance) recited by the system over the phone or displayed on the client's screen, and questions asked of the client either verbally over the phone or textually on a display screen. As before, questions may be multiple-choice menu selections, or may request free-form responses.

In calls or chat sessions where a live agent is connected, the machine learning algorithm continues to operate and provide guidance of the user interaction, and in a preferred embodiment, the machine learning algorithm proposes a next action or question and the live agent presents the action or question to the client. In the case of a phone call, the client clearly understands that a person (the agent) is talking, even though the presented action or question may have been proposed by the machine learning algorithm. In the case of a text chat, the agent may prepend or append a few words to make the action or question appear to be presented in a more natural conversational style. The system may also allow the live agent to say or type something independent of the system's recommendation, which may be desirable in some circumstances.

In situations where information is presented to the client, the system follows up by asking if the client's matter has been resolved, or if further information is needed, or another matter would like to be addressed by the client, or some question of this sort. The client may respond and indicate that nothing further is needed, or may ask for further assistance. Of course, the client may also simply hang up or terminate the chat. Whenever possible, the system asks the client for a satisfaction rating when the client's matter is resolved.

In situations where an action—such as a transaction—is performed, the system provides a confirmation of what was done, and then follows up with a question asking if anything further is needed, as above.

The machine learning algorithm for guiding a user interaction, described above, allows the user to provide free-form answers to some questions. The free-form answers may be spoken when the user is on a phone call with the system, or the answers may be written in text form when the user is on a chat with the system. In either case, the user's answers may include misspoken or misused words, ancillary noises (such as "um" or "uh"), typographical errors and other unhelpful content. The machine learning algorithm therefore needs to parse out the user's responses, remove or correct the unhelpful content, and put the responses in a form where they can be further analyzed. Thus, at least a portion of the machine learning system for guiding user interactions is a natural language processing (NLP) application. The NLP portion of the machine learning system may be particularly well suited for being handled using a recurrent neural network (RNN), as RNNs are known to be adept at handling natural language processing applications. An RNN may be used for the entire machine learning system for guiding user interactions, or an RNN may be used only for a response processing module which then hands off parsed user responses to another module (possibly using a different type of neural network) which performs a subsequent analysis to determine the next question or action to propose. Other architectures and embodiments may also be used.

FIG. 7 is a flow chart diagram 700 of a method for guiding a user interaction including dialog and actions, using a machine learning algorithm of the type discussed above, according to at least one embodiment of the present disclosure. Whereas FIG. 6 (discussed above) describes a general method for training and deploying a machine learning system, FIG. 7 describes the execution of the machine learning system during live user interactions (i.e., in the system as deployed at the step 616 of FIG. 6). The live user interaction with the machine learning system, depicted in FIG. 7, is also known as the inference mode by those skilled in the art of AI systems.

At box 702, a user contacts the system via a phone call or by initiating a chat session. In the examples discussed above, the user is a client who is contacting a business such as a bank. The user has a matter with which they need assistance—such as a question to be answered, a problem to be solved, a transaction to be performed, or the like. The system is a computer system in communication with the user via the phone call or chat, as shown in FIG. 1, where the computer system runs the machine learning algorithm for guiding the user interaction.

At box 704, the system asks an initial question and receives a response from the user. The initial question could be a conversational question (e.g., "what can I help you with?") with a free-form response, or the initial question could offer a menu of numbered options from which the user may select one. At box 706, based on the answer to the initial question, the system determines a next question to ask or a next action to perform. For example, based on the answer to the initial question, it could be apparent that the user simply wants a piece of information (such as an account balance, or a payment due date), and in this case the system will determine that providing the information (rather than asking another question) is the best next step. In other cases, at least one more question will need to be asked, and determining the next question is performed at the box 706. Determining the next question or action, at the box 706, is performed by the machine learning algorithm of the system described above, where the machine learning algorithm has been trained to determine a next question or action which is most likely to lead to a quick resolution of the matter.

Determining the next question or action, at the box 706, may be repeated several times during the course of a user interaction (call or chat). This will be discussed below, where if the matter is not resolved by the most recent system action, the process returns to the box 706 to determine what to do next.

One determination that could be made at the box 706, either the first time through the process or later after looping back, is that it is advantageous to connect a live agent into the call or chat. When this determination is made, the live agent is connected at box 708 and the process returns to the box 706 to determine a next question or action. Reasons that the machine learning algorithm would determine that a live agent is needed may vary—including ambiguity in user responses, complexity of a transaction that needs to be completed, etc.

At box 710, the question or action determined by the system at the box 706 is presented to the user. If a question is identified as the next step at the box 706, then that question has been identified by the machine learning algorithm as being most likely to lead to a quick and satisfactory resolution of the user's matter. If an action is identified as the next step at the box 706, then that action has been identified by the machine learning algorithm as being most likely to provide a quick and satisfactory resolution of the user's matter. The action may be a transaction (e.g., transfer funds between accounts), or the action may be providing information to the user (e.g., a payment due date), for example.

As discussed earlier, when the live agent is connected into the call or chat, the human agent presents the question or action to the user, either verbally (on a phone call) or by sending an algorithm-generated text (on a chat, where the text may be slightly personalized by the agent). When no live agent is connected into the call or chat, the system presents the question or action to the user, in a known manner.

At box 712, the user responds to the question, action or information presented at the box 710. If a question was presented at the box 710, the user answers the question, either in a free-form verbal/text manner or by selecting a menu option, as described earlier. If information was presented or an action was performed at the box 710, the user indicates whether the information or action satisfied the user's requirements, and/or whether anything else is needed. Again, the user responses may be simple yes/no or numerical answers, or the user responses may include free-form text which must be parsed and analyzed to determine what the user is trying to convey.

At decision diamond 714, the system determines whether the user's matter is resolved, based on the response received at the box 712. Determining whether the matter is resolved may involve analysis of the user's response when the response is a free-form phrase or sentence, possibly including extraneous noises, misused or misspelled words, etc.

If a question was presented at the box 710 (other than a question asking if the user's matter has been resolved), and the user's response at the box 712 is an answer to the question, then the dialog most likely needs to continue, and the process returns to the box 706 where the system determines the next question or action. If information was presented or an action was performed at the box 710, and the user indicated at the box 712 whether the information or action satisfied the user's requirements and/or whether anything else is needed, then the user's response provides a solid indication whether the matter is resolved or not. It is always possible that the user may provide an unexpected question or response at the box 712, in which case the determination at the decision diamond 714 involves more analysis by the machine learning algorithm.

When the process loops back to the box 706, the system determines the next question or action based on the most recent user response and any previous questions/responses from the current user interaction. With a sufficient number of training examples, the machine learning algorithm can identify patterns in complex dialogs, and infer a next best step based on those patterns, in a way that simple statically-programmed voice response systems and chat engines cannot. Specifically, a certain type of user response to a previous question, combined with a certain type of response to the most recent question, may be determined by the machine learning algorithm to indicate a particular next question or action, where the most recent response alone may not indicate that particular question or action. Only a machine learning algorithm as disclosed herein can perform this type of analysis practically.

When it is determined that the user's matter is resolved at the decision diamond 714, the process moves to box 716 where the entire user interaction is stored in a database. This includes storing the questions and actions/information presented by the system, and the user's responses. It also includes storing a final outcome—e.g., a likelihood that the user's matter was resolved, and a satisfaction level of the user. The satisfaction level may be determined by asking the user. In some cases, it may be necessary to estimate the likelihood that the matter was resolved and/or the satisfaction level; this would be the case if the user simply hangs up or ends the chat session, for example. The process depicted in FIG. 7 ends at terminus 718 after the user interaction session data has been stored.

In the preceding discussion of FIG. 7, various examples of actions were provided, including transactions between the client and the business (e.g., bank). It is to be understood that before any transaction is finalized, it may be necessary to perform a verification or authentication step, where the system verifies or validates the identity of the client. This may include any suitable form of authentication—such as requiring the client to provide information (e.g., date of birth, answers to security questions) in the phone or chat session, performing a two-factor authentication by requiring the client to enter a code which the system sends to a known email address or phone number of the client, performing a biometric identity verification, or any other appropriate authentication technique or technology.

FIG. 8 is a flow chart diagram 800 of a method for training and deploying a machine learning algorithm for guiding a user interaction as described in FIG. 7, including performing ongoing update training of the machine learning algorithm based on actual outcomes of real user interactions handled by the algorithm, according to at least one embodiment of the present disclosure. Prior to the first step in FIG. 8, an architecture for the AI user interaction system is chosen, such as using a machine learning algorithm, and more particularly, a specific type such as a recurrent neural network (RNN), as discussed earlier.

At box 802, initial training is performed on the machine learning algorithm used in the AI user interaction system. The initial training was described earlier, including performing a supervised learning of the machine learning algorithm using transcriptions of past user interactions for which decisions, actions and outcomes have been identified. The initial training was also described in FIG. 6 discussed previously.

At box 804, the AI user interaction system including the machine learning algorithm is deployed for operation handling actual user calls and chat sessions. This step was shown in the box 616 of FIG. 6, and has been discussed at length above. The operational phase of the AI user interaction system is known as inference mode. At box 806, the AI user interaction system including the machine learning algorithm is operated in inference mode, handling actual user calls and chat sessions; this process was depicted in the flowchart diagram of FIG. 7. At box 808, data from each completed user interaction (call or chat) is collected and stored in a database 810. This data storage step was shown in the box 716 of FIG. 7 and discussed above.

At decision diamond 812, it is determined whether update training is needed for the machine learning algorithm in the AI user interaction system. This determination may be made based on any suitable factors—such as a length of elapsed time or a number of user interactions handled since system deployment or most recent update training, or an availability of an upcoming system maintenance window where an updated version of the AI system may conveniently be placed into operation. Other factors may also lead to a determination that update training of the machine learning algorithm is needed or desired; this determination can be made in any suitable manner by the business. If update training is not called for at the decision diamond 812, the AI user interaction system continues to operate at the box 806.

When update training is called for at the decision diamond 812, the update training is performed at box 814. This typically involves making a copy of the production machine learning system and performing supervised learning on the copy. The supervised learning which is performed in the update training at the box 814 includes the user interaction data from the database 810—that is, the calls and chats which were handled by the production system at the box 806. The user interaction data from the database 810 may be used to incrementally train the machine learning algorithm, or the user interaction data from the database 810 may be used to train the machine learning algorithm "from scratch" (a naïve system), optionally also including some or all of the data used in the initial training at the box 802.

After the update training is performed at the box 814, the new version of the AI user interaction system including the machine learning algorithm is deployed for operation at the box 804. Data from actual user interactions at the box 806 continues to be collected, and update training can again be performed at a future time as desired.

The machine learning algorithm and training techniques defined by the flowcharts of FIGS. 7 and 8, and described above, may be implemented in a system of the type shown in FIG. 1 as follows. The client (the person who is calling or chatting with the business) is represented by the user 110 in FIG. 1. The user 110 may be using the computing device 104 (e.g., a laptop or desktop computer, a tablet device, etc.) or the user 110 may be using the mobile device 106, in either a textual interaction (using a display and a real or virtual keyboard) or an audio phone call interaction. The user 110 may also use any other type of telephone (land line, voice-over-IP, etc.) in an audio phone call interaction.

The business (the entity or organization which is talking or text-chatting with the client) is represented by the enterprise system 200 in FIG. 1. This includes the computing system 206 which is configured, for example, with a machine learning algorithm (FIGS. 7-8) programmed as an application 232 and executing on the processor 220. The memory 222 and the data 234 are accessed by the machine learning algorithm running on the processor 220 in a manner known to those skilled in the art.

As discussed above, the user 110 may be interacting with an entirely automated system (i.e., the virtual agent 214) or with an actual person (i.e., the human agent 210). In either case, the dialog and actions of the user interaction are guided using the machine learning algorithm described in the flowchart of FIG. 7 and running on the computing system 206. That is—a next question or action, based on answers to previous questions—is identified by the machine learning algorithm, and is communicated to the user either verbally (for audio phone calls) or textually (for chat sessions). This continues until a final resolution of the user's matter is achieved.

The AI user interaction system including the machine learning algorithm, discussed above, provides features for adaptability and dialog pattern recognition which are not found in existing statically-programmed voice response systems and chat engines. These features enable the AI user interaction system to effectively navigate through diverse and uncertain dialogs to quickly resolve the user's matter. This leads to increased satisfaction by the users of the system (the clients), which in turn benefits the business operating the system.

Particular embodiments and features of the disclosed methods and systems have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for guiding a user interaction during a phone call or a chat session, said system comprising:

a computer with one or more processor and memory, where the computer executes a machine learning algorithm configured to guide dialog and actions during a phone call or a chat session with a user concerning a user matter; and a network connection operatively connecting the user via a user device to the computer, where the machine learning algorithm is configured to perform steps including:

asking an initial question of the user and receiving a response from the user;

determining a next step based on the response, where the next step is determined by the machine learning algorithm based on probability of a most rapid resolution of the user matter, and where the next step is selected from a group consisting of asking another question of the user and performing an action;

determining a next question when the next step is asking another question of the user;

determining a next action when the next step is performing an action, where the next action is selected from a group comprising consisting of authenticating an identity of the user, providing account information to the user, performing an account transaction for the user, providing assistance to the user in logging into an electronic data system, and connecting a live agent;

connecting a live agent into the phone call or the chat session when connecting the live agent is determined as the next action, where connecting the live agent is determined as the next action for reasons including ambiguity in the response from the user and complexity of the user matter;

presenting the next question or the next action to the user;

receiving a user response to the next question or next action which was presented;

determining if the user matter has been resolved based on the user response;

returning to determining a next step when the user matter has not been resolved; and ending the phone call or the chat session and storing data describing the user interaction when the user matter has been resolved.

2. The system according to claim 1 wherein the phone call or the chat session transpires between the user device and the computer over the network connection, where the user device is one of a mobile phone, a non-mobile phone, a tablet device, a computer or a display screen with a virtual or physical keyboard.

3. The system according to claim 2 wherein the network connection includes one or more of the Internet, a local area network, a wide area network, a cellular network, a landline or hard-wired telephone system, and a satellite communication system.

4. The system according to claim 1 wherein the machine learning algorithm uses a neural network.

5. The system according to claim 4 wherein the neural network is a feedforward neural network, a convolutional neural network or a recurrent neural network.

6. The system according to claim 4 wherein at least part of the neural network is configured as a natural language processing application.

7. The system according to claim 1 wherein the machine learning algorithm is initially trained via supervised learning using a dataset of previous user interactions supplemented with decision points, actions which resulted in matter resolution, and user satisfaction level.

8. The system according to claim 7 wherein the machine learning algorithm is periodically provided with update training via supervised learning using a dataset containing the data describing each user interaction which was stored when each phone call or chat session was ended.

9. The system according to claim 1 wherein determining a next step includes considering, by the machine learning algorithm, one or more previous user responses from the user interaction in addition to a most recent user response.

10. The system according to claim 1 wherein presenting the next question or the next action to the user includes presenting by the computer when no live agent is participating in the phone call or chat session, and presenting by the live agent when the live agent is participating.

11. A system for guiding a user interaction during a phone call or a chat session, said system comprising:

a computer with one or more processor and memory, where the computer executes a machine learning algorithm configured to guide dialog and actions during a phone call or a chat session with a user concerning a user matter; and a network connection operatively connecting the user via a user device to the computer, where the machine learning algorithm includes a neural network configured to perform steps including:

asking an initial question of the user and receiving a response from the user;

determining a next step based on the response, where the next step is determined by the machine learning algorithm based on probability of a most rapid resolution of the user matter, and where the next step is selected from a group consisting of asking another question of the user and performing an action;

determining a next question when the next step is asking another question of the user;

determining a next action when the next step is performing an action, where the next action is selected from a group consisting of authenticating an identity of the user, providing account information to the user, performing an account transaction for the user, providing assistance to the user in logging into an electronic data system, and connecting a live agent;

connecting a live agent into the phone call or the chat session when connecting the live agent is determined as the next action, where connecting the live agent is determined as the next action for reasons including ambiguity in the response from the user and complexity of the user matter;

presenting the next question or the next action to the user;

receiving a user response to the next question or next action which was presented;

determining if the user matter has been resolved based on the user response;

returning to determining a next step when the user matter has not been resolved; and ending the phone call or the chat session and storing data describing the user interaction when the user matter has been resolved, and where the neural network is initially trained via supervised learning using a dataset of previous user interactions supplemented with decision points, actions which resulted in matter resolution, and user satisfaction level.

12. The system according to claim 11 wherein the neural network is periodically provided with update training via supervised learning using a dataset containing the data describing each user interaction which was stored when each phone call or chat session was ended.

13. The system according to claim 11 wherein determining a next step includes considering, by the neural network, one or more previous user responses from the user interaction in addition to a most recent user response.

14. A method for guiding a user interaction during a phone call or a chat session, said method comprising:
providing a computer with one or more processor and memory, where the computer executes a machine learning algorithm configured to guide dialog and actions during a phone call or a chat session with a user concerning a user matter, and the computer uses a network connection to connect to the user via a user device,
where the machine learning algorithm is configured to perform steps including:
asking an initial question of the user and receiving a response from the user;
determining a next step based on the response, where the next step is determined by the machine learning algorithm based on probability of a most rapid resolution of the user matter, and where the next step is selected from a group consisting of asking another question of the user and performing an action;
determining a next question when the next step is asking another question of the user;
determining a next action when the next step is performing an action, where the next action is selected from a group comprising consisting of authenticating an identity of the user, providing account information to the user, performing an account transaction for the user, providing assistance to the user in logging into an electronic data system, and connecting a live agent;
connecting a live agent into the phone call or the chat session when connecting the live agent is determined as the next action, where connecting the live agent is determined as the next action for reasons including ambiguity in the response from the user and complexity of the user matter;
presenting the next question or the next action to the user;
receiving a user response to the next question or next action which was presented;
determining if the user matter has been resolved based on the user response;
returning to determining a next step when the user matter has not been resolved; and
ending the phone call or the chat session and storing data describing the user interaction when the user matter has been resolved.

15. The method according to claim 14 wherein the machine learning algorithm uses a neural network.

16. The method according to claim 15 wherein the neural network is a feedforward neural network, a convolutional neural network or a recurrent neural network, and at least part of the neural network is configured as a natural language processing application.

17. The method according to claim 14 wherein the machine learning algorithm is initially trained via supervised learning using a dataset of previous user interactions supplemented with decision points, actions which resulted in matter resolution, and user satisfaction level.

18. The method according to claim 14 wherein determining a next step includes considering, by the machine learning algorithm, one or more previous user responses from the user interaction in addition to a most recent user response.

19. The method according to claim 14 wherein presenting the next question or the next action to the user includes presenting by the computer when no live agent is participating in the phone call or chat session, and presenting by the live agent when the live agent is participating.

* * * * *